(12) United States Patent
Oh et al.

(10) Patent No.: US 12,393,306 B2
(45) Date of Patent: Aug. 19, 2025

(54) DISPLAY DEVICE AND METHOD FOR DRIVING THE SAME

(71) Applicant: LG DISPLAY CO., LTD., Seoul (KR)

(72) Inventors: Daeseok Oh, Paju-si (KR); Yonghwa Park, Paju-si (KR); Daeho Park, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/214,281

(22) Filed: Jun. 26, 2023

(65) Prior Publication Data

US 2024/0134481 A1 Apr. 25, 2024
US 2024/0231539 A9 Jul. 11, 2024

(30) Foreign Application Priority Data

Oct. 20, 2022 (KR) .......................... 10-2022-0135591

(51) Int. Cl.
G06F 3/041 (2006.01)
G06F 3/044 (2006.01)
G09G 3/20 (2006.01)

(52) U.S. Cl.
CPC .......... *G06F 3/04184* (2019.05); *G06F 3/044* (2013.01); *G09G 3/2007* (2013.01); *G09G 3/2096* (2013.01); *G09G 2310/0213* (2013.01); *G09G 2310/0275* (2013.01); *G09G 2310/08* (2013.01); *G09G 2354/00* (2013.01)

(58) Field of Classification Search
CPC .................................................. G06F 3/04184
See application file for complete search history.

(56) References Cited

U.S. PATENT DOCUMENTS

| | | | | |
|---|---|---|---|---|
| 5,852,427 A | * | 12/1998 | Buzak | G09G 3/3662 345/97 |
| 2008/0062147 A1 | * | 3/2008 | Hotelling | G06F 3/0443 455/566 |
| 2011/0276750 A1 | * | 11/2011 | Kim | G06F 12/0246 711/E12.008 |
| 2013/0293498 A1 | * | 11/2013 | Kim | G06F 3/0446 345/212 |

(Continued)

FOREIGN PATENT DOCUMENTS

KR 10-2018-0003734 A 1/2018

*Primary Examiner* — William Boddie
*Assistant Examiner* — Bipin Gyawali
(74) *Attorney, Agent, or Firm* — Morgan, Lewis & Bockius LLP (57) ABSTRACT

A display device and a driving method thereof may be capable of compensating for noise caused by image data with inverted image data to cancel a noise component. The device includes a display panel divided into a first area and a second area; a first source driving circuit and a second source driving circuit for providing a source signal to the first area and the second area, respectively; a gate driving circuit for providing a scan signal; a touch driving circuit for applying a touch driving signal and sensing a touch signal; and a timing controller. The timing controller controls corresponding circuits to display first image data on the first area during a first display time, and to provide a source signal corresponding to first inverted data obtained by inverting the first image data to the second area during the first display time.

24 Claims, 10 Drawing Sheets

(56) References Cited

U.S. PATENT DOCUMENTS

| | | | |
|---|---|---|---|
| 2016/0189655 A1* | 6/2016 | Choi | G09G 3/3674 |
| | | | 345/215 |
| 2016/0202829 A1* | 7/2016 | Choi | G06F 3/0443 |
| | | | 345/174 |
| 2017/0103723 A1* | 4/2017 | Chen | G09G 3/3677 |
| 2017/0103725 A1* | 4/2017 | Seki | G09G 3/3677 |
| 2019/0294310 A1* | 9/2019 | Lee | G06F 3/04184 |
| 2022/0206663 A1* | 6/2022 | Kim | G09G 3/3655 |

* cited by examiner

DISPLAY DEVICE AND METHOD FOR DRIVING THE SAME

CROSS-REFERENCE TO RELATED APPLICATION

This application claims priority from Korean Patent Application No. 10-2022-0135591 filed on Oct. 20, 2022, in the Korean Intellectual Property Office, and all the benefits accruing therefrom under 35 U.S.C. 119, the contents of which in its entirety are herein incorporated by reference.

BACKGROUND

Technical Field

The present disclosure relates to a display device, and more particularly, to a display device and a method for driving the same capable of reducing touch noise.

Discussion of the Related Art

A touch user interface is essentially employed for portable information devices such as smart phones, and is being widely applied to notebook computers, computer monitors, and home appliances.

An in-cell touch sensor scheme in which touch sensors are embedded in a pixel array of a display panel is being applied to a display device. In the in-cell touch sensor scheme, the touch sensors may be installed in the display panel without increasing a thickness of the display panel.

SUMMARY

The display device may employ a scheme in which a display operation and a touch operation occur in the same frame. In this regard, there is a problem in that a touch SNR (Signal to Noise Ratio) is reduced because a low power voltage ELVSS coupled to image data affects touch sensing.

To solve this problem, the touch operation is isolated from the display operation during a vertical blank period. However, in this case, image quality deterioration occurs due to FOS (Front of Screen) issue resulting from decrease in a display time.

After all, the touch operation isolation or the noise reduction is required to minimize the touch SNR reduction during the display time. Thus, a technology for fundamentally reducing the noise is required.

The inventors of the present disclosure have invented a display device capable of canceling a noise component caused by the image data.

Accordingly, embodiments of the present disclosure are directed to a display device and a method for driving the same that substantially obviate one or more of the problems due to limitations and disadvantages of the related art.

An aspect of the present disclosure is to provide a display device and a driving method thereof to compensate for the noise caused by the image data with inverted image data to cancel the noise component.

A further aspect of the present disclosure is to provide a display device and a driving method thereof capable of reducing or avoiding display noise to improve the touch SNR.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display device comprises a display panel divided into a first area and a second area; a first source driving circuit and a second source driving circuit for providing a source signal to the first area and the second area, respectively; a gate driving circuit for providing a scan signal to each of the first area and the second area; a touch driving circuit for applying a touch driving signal to the display panel and sensing a touch signal; and a timing controller for controlling the first source driving circuit, the second source driving circuit, the gate driving circuit, and the touch driving circuit, wherein the timing controller controls the first source driving circuit and the gate driving circuit to display first image data on the first area during a first display time, wherein the timing controller controls the second source driving circuit and the gate driving circuit to provide a source signal corresponding to first inverted data obtained by inverting the first image data to the second area during the first display time.

In another aspect, a method for driving a display device comprises controlling, by the timing controller, the first source driving circuit and the gate driving circuit to display first image data on the first area during a first display time; and controlling, by the timing controller, the second source driving circuit and the gate driving circuit to provide a source signal corresponding to first inverted data obtained by inverting the first image data to the second area during the first display time.

The display device and the driving method thereof according to an embodiment may compensate for the noise caused by the image data with the inverted image data, thereby canceling the noise component.

Further, the display device and the driving method thereof according to an embodiment may reduce or avoid the display noise to improve the touch SNR.

Further, the display device and the driving method thereof according to an embodiment may perform the display operation and the touch operation not in a temporal separation manner but in an temporally overlapping manner, thereby solving the touch sensing time shortage problem and the display charging time shortage problem.

Further, the display device and the driving method thereof according to an embodiment may reduce distortion of the touch sensing signal due to the display noise, so that sensitivity of the touch sensing and quality of the display image may be improved.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles.

DETAILED DESCRIPTION

Advantages and features of the present disclosure, and a method of achieving the advantages and features will become apparent with reference to embodiments described later in detail together with the accompanying drawings. However, the present disclosure is not limited to the embodiments as disclosed below, but may be implemented in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

A shape, a size, a ratio, an angle, a number, etc. disclosed in the drawings for describing the embodiments of the present disclosure are exemplary, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "including", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like may be disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like may be disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event may occur therebetween unless "directly after", "directly subsequent" or "directly before" is indicated.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The features of the various embodiments of the present disclosure may be partially or entirely combined with each other, and may be technically associated with each other or operate with each other. The embodiments may be implemented independently of each other and may be implemented together in an association relationship.

In interpreting a numerical value, the value is interpreted as including an error range unless there is separate explicit description thereof.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

The features of the various embodiments of the present disclosure may be partially or entirely combined with each other, and may be technically associated with each other or operate with each other. The embodiments may be implemented independently of each other and may be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a display device and a driving method thereof according to some embodiments will be described.

Prior to describing the display device and the driving method thereof according to the embodiment, the meaning of terms used in the present disclosure is defined.

As used herein, inverse compensation data and inverted data may be defined as data corresponding to a gray-scale voltage obtained by inverting a gray-scale voltage corresponding to image data, based on an intermediate gray-scale voltage in a gray-scale range.

Figure 1:
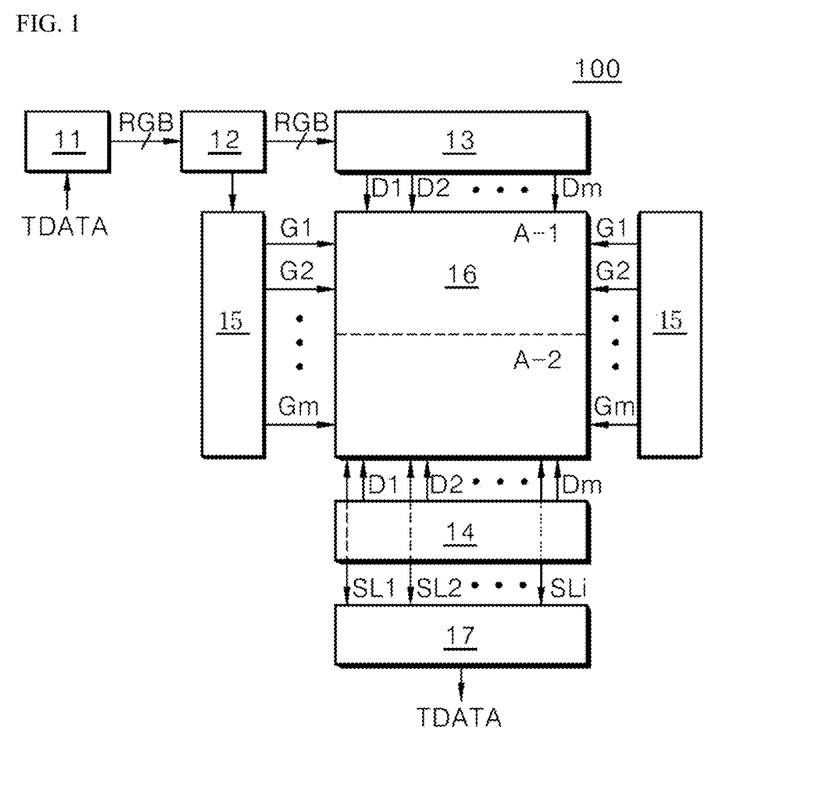
FIG. 1 is a block diagram of a display device according to an embodiment.

FIG. 1 is a block diagram of a display device according to an embodiment.

Referring to FIG. 1, a display device 100 according to an embodiment includes a display panel 16, a first source driving circuit 13, a second source driving circuit 14, a gate driving circuit 15, a touch driving circuit 17, and a timing controller 12.

The display panel 16 is divided into a first area A-1 and a second area A-2. A pixel array of the first area A-1 and the second area A-2 includes pixels disposed in pixel areas defined by data lines D1 to Dm (m is a positive integer), and gate lines G1 to Gn (n is a positive integer).

Each of the pixels may include a thin film transistor (TFT), a storage capacitor, and a common electrode formed at each of intersections between the data lines D1 to Dm and the gate lines G1 to Gn.

The common electrode of the pixels may be divided into a number of segments, and touch sensors are implemented with the divided segments of the common electrode. One common electrode segment is commonly connected to multiple pixels and constitutes one touch sensor. A plurality of touch sensors disposed on one line may constitute one touch block line. In addition, each touch sensor may include a plurality of pixels defined by the plurality of gate lines and data lines.

The first source driving circuit 13 transmits a source signal corresponding to image data RGB to the data lines D1 to Dm of the first area A-1 of the display panel 16 under the control of the timing controller 12.

The second source driving circuit 14 transmits a source signal corresponding to the image data RGB to the data lines D1 to Dm of the second area A-2 of the display panel 16 under the control of the timing controller 12. Each of the first source driving circuit 13 and the second source driving circuit 14 may include a plurality of source drivers based on resolution and a size of the display panel 16.

The gate driving circuit 15 provides a scan signal to the gate lines G1 to Gn of the first area A-1 and the second area A-2 of the display panel 16 under the control of the timing controller 12. In one example, the gate driving circuit 15 may sequentially output the scan signal to the gate lines of the first area A-1 of the display panel 16 in response to a top start signal TOP-VST, and may sequentially output the scan signal to the gate lines of the second area A-2 of the display panel 16 in response to a bottom start signal BTM-VST.

The gate driving circuit 15 generates a gate pulse synchronized with a source signal with reference to a scan timing control signal from the timing controller 12. The gate driving circuit 15 may include at least one gate driver and may be directly formed in the display panel 16 according to a GIP (Gate driver In Panel) scheme. In one example, the gate driving circuit 15 may be provided on each of both opposing sides of the display panel 16.

The touch driving circuit 17 applies a touch driving signal to the display panel 16 via touch block lines SL1 to SLi and senses touch coordinate data TDATA. The touch driving circuit 17 drives the touch sensors built in the pixel array of the display panel 16 and senses the touch sensors. The touch sensors may be implemented as capacitive sensors that sense a touch input.

The touch driving circuit 17 may drive the touch sensors for a period overlapping an image data writing time in the same frame period. In this regard, touch sensors of other touch block lines than a touch block line on which the image data writing is being carried out may be selectively sensed.

In this way, the touch driving circuit 17 may drive the display writing and the touch sensing not in a temporally separating manner in the same frame, but in a spatially separating manner in the display panel 10.

FIG. 1 shows that the touch driving circuit 17, the first source driving circuit 13, and the second source driving circuit 14 as separate components. However, the present disclosure is not limited thereto. The touch driving circuit 17 may include a read-out circuit, and the read-out circuit and the source driver in each of the first source driving circuit 13 and the second source driving circuit 14 may be implemented into one integrated circuit.

The timing controller 12 controls the first source driving circuit 13, the second source driving circuit 14, the gate driving circuit 15, and the touch driving circuit 17.

The timing controller 12 receives timing signals such as a vertical synchronization signal, a horizontal synchronization signal, a data enable signal, and a main clock input from a host system 11 and synchronizes operation timings of the source driving circuits 13 and 14 and the gate driving circuit 15 with each other.

The timing controller 12 provides a scan timing control signal to the gate driving circuit 15. In one example, the scan timing control signal may include a gate start pulse, a gate shift clock, a gate output enable signal, etc.

The timing controller 12 provides a data timing control signal to the source driving circuits 13 and 14. In one example, the data timing control signal may include a source sampling clock, a polarity control signal, a source output enable signal, etc.

The timing controller 12 controls corresponding circuits to display first image data in the first area A-1 of the display panel 16 during a first display time of one frame period, and to provide a source signal corresponding to first inverted data obtained by inverting the first image data to the second area A-2 of the display panel 16 during the first display time.

Then, the timing controller 12 controls corresponding circuits to provide second inverted data obtained by inverting second image data to the first area A-1 of the display panel 16 during a second display time of one frame period, and to display the second image data in the second area A-2 of the display panel 16 during the second display time.

In this way, the timing controller 12 compensates for the noise caused by the image data with the inverted image data, thereby canceling out the noise component.

The host system 11 transmits the timing signals along with the image data RGB to the timing controller 12, and may execute an application program associated with the touch coordinate data TDATA input from the touch driving circuit 17.

Figure 2A:
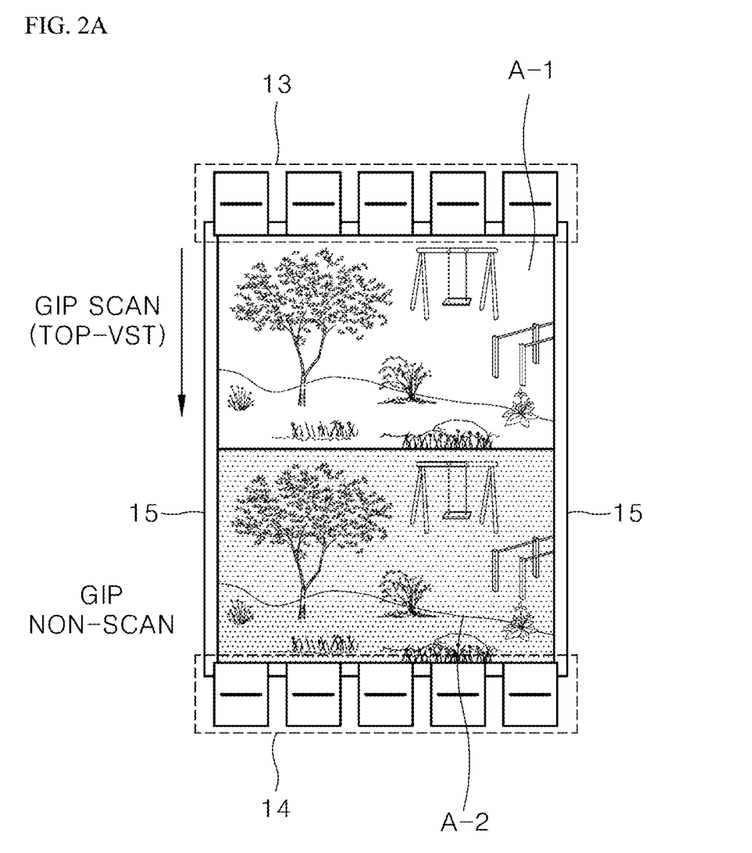
FIG. 2A and FIG. 2B are block diagrams for illustrating a display device and a driving method thereof according to an embodiment.
Figure 2B:
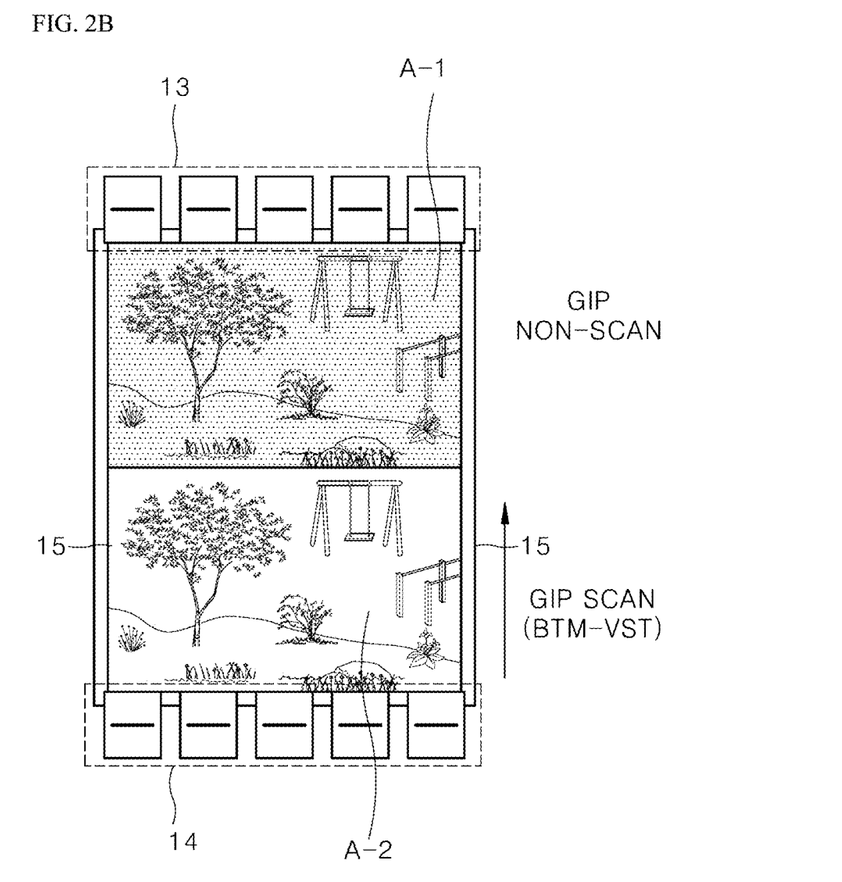
Figure 3:
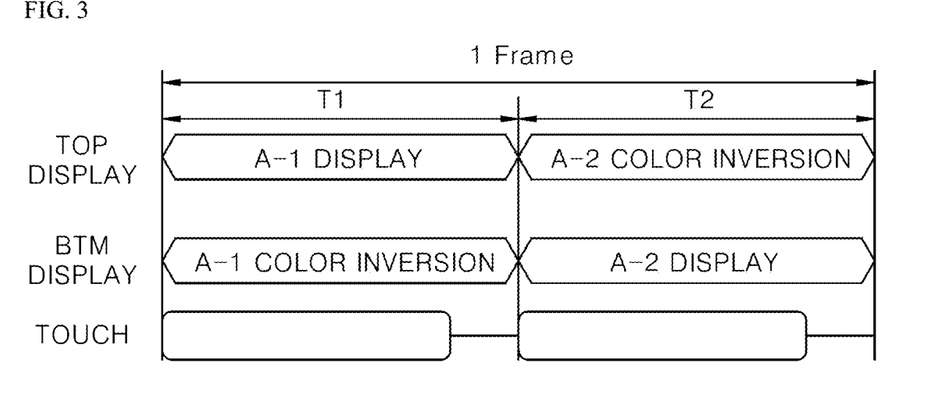
FIG. 3 is a timing diagram for illustrating a method for driving a display device according to an embodiment.

FIG. 2A and FIG. 2B are block diagrams for illustrating a display device and a driving method thereof according to an embodiment. FIG. 3 is a timing diagram for illustrating a method for driving a display device according to an embodiment.

Referring to FIG. 2A, FIG. 2B and FIG. 3, first, the display device 100 according to an embodiment controls corresponding circuits to display the first image data on the first area A-1 of the display panel 16 during the first display time T1 of one frame period, and to provide the source signal corresponding to the first inverted data obtained by inverting the first image data to the second area A-2 of the display panel 16 during the first display time T1.

The display device 100 controls the gate driving circuit 15 to sequentially output the scan signal to the gate lines of the first area A-1 of the display panel 16 during the first display time T1 and not to output the scan signal to the gate lines of the second area A-2 of the display panel 16 during the first display time T1. In one example, the gate driving circuit 15 sequentially outputs the scan signal to the gate lines of the first area A-1 of the display panel 16 in response to the top start signal TOP-VST.

The display device 100 controls the first source driving circuit 13 and the gate driving circuit 15 to output a source voltage corresponding to the first image data to the pixels of the first area A-1 of the display panel 16 during the first display time T1, and controls the second source driving circuit 14 and the gate driving circuit 15 to output a source voltage corresponding to the first inverted data obtained by inverting the first image data to the data lines of the second area A-2 of the display panel 16 during the first display time T1.

The first image data may be defined as data to be displayed in the first area A-1 of the display panel 16. The first inverted data may be defined as data corresponding to a gray-scale voltage obtained by inverting a gray-scale voltage corresponding to the first image data, based on an intermediate gray-scale voltage in a gray-scale range.

While the first image data is displayed on the pixels of the first area A-1 of the display panel 16, the gray-scale voltage corresponding to the first inverted data may be applied to the data lines of the second area A-2 of the display panel 16 in a state where no scan signal is output to the gate lines of the second area A-2.

The display device 100 controls the touch driving circuit 17 to apply a touch driving signal to the display panel 16 during the first display time T1.

In one example, the display device 100 may control the touch driving circuit 17 to apply to the touch driving signal to the display panel 16 during a portion of the first display time T1 during which the first inverted data obtained by inverting the first image data is provided to the second area A-2 of the display panel 16.

In one example, the first display time T1 may be set to ½ of one frame period.

Next, the display device 100 according to an embodiment controls corresponding circuits to transmit the second inverted data obtained by inverting the second image data to the first area A-1 of the display panel 16 during the second display time T2 of one frame period and to display the second image data on the second area A-2 of the display panel 16 during the second display time T2.

The display device 100 controls the gate driving circuit 15 not to output the scan signal to the gate lines of the first area A-1 of the display panel 16 during the second display time T2 and to sequentially output the scan signal to the gate lines of the second area A-2 of the display panel 16 during the second display time T2. In one example, the gate driving circuit 15 sequentially outputs the scan signal to the gate lines of the second area A-2 of the display panel 16 in response to the bottom start signal BTM-VST.

The display device 100 controls the first source driving circuit 13 and the gate driving circuit 15 to output the source voltage corresponding to the second inverted data to the data lines of the first area A-1 of the display panel 16 during the second display time T2, and controls the second source driving circuit 14 and the gate driving circuit 15 to output the source voltage corresponding to the second image data to the pixels of the second area A-2 of the display panel 16 during the second display time T2.

The second image data may be defined as data to be displayed on the second area A-2 of the display panel 16. The second inverted data may be defined as data corresponding to a gray-scale voltage obtained by inverting a gray-scale voltage corresponding to the second image data based on an intermediate gray-scale voltage in a gray-scale range.

While the second image data is displayed on the pixels of the second area A-2 of the display panel 16, the gray-scale voltage corresponding to the second inverted data may be applied to the data lines of the first area A-1 of the display panel 16 in a state where the scan signal is not output to the gate lines of the first area A-1.

The display device 100 controls the touch driving circuit 17 to apply a touch driving signal to the display panel 16 during the second display time T2. In one example, the display device 100 may control the touch driving circuit 17 to apply the touch driving signal to the display panel 16 during a portion of the second display time T2 during which the second inverted data is provided to the first area A-1 of the display panel 16.

In one example, the second display time T2 is set to ½ of one frame period.

In one example, the display device 100 may sequentially drive a top area display and a bottom area display in a top/bottom data separation structure of the display panel 16. In the top area display, the inverted data obtained by inverting the image data of the top area may be output to the bottom area while the bottom area is not scanned. Thus, a noise reduction effect may be obtained due to the ELVDD/ELVSS data coupling canceling effect, and a pen touch SNR increase effect may be obtained in the canceling period.

Figure 4:
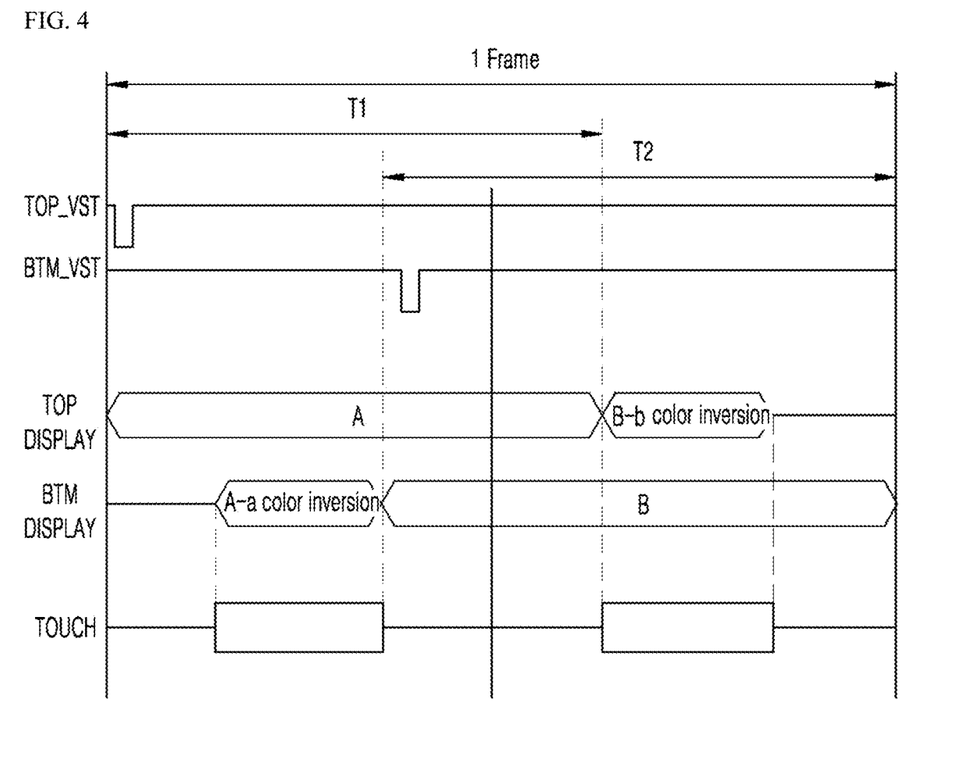
FIG. 4 is a timing diagram for illustrating a method for driving a display device according to another embodiment.

FIG. 4 is a timing diagram for illustrating a method for driving a display device according to another embodiment.

Referring to FIG. 2A, FIG. 2B and FIG. 4, first, the display device 100 controls corresponding circuits to display first image data A on the first area A-1 of the display panel 16 during a first display time T1 of one frame period.

In this regard, the display device 100 controls corresponding circuits to a source signal corresponding to first inverted data A-a obtained by inverting the first image data to the second area A-2 of the display panel 16 during a portion of the first display time T1.

In one example, the first display time T1 is set to be larger than ½ of one frame period.

The display device 100 controls the touch driving circuit 17 to apply a touch driving signal to the display panel 16 for the portion of the first display time T1. In one example, the display device 100 may apply a touch driving signal to the display panel 16 while the first inverted data A-a is provided to the second area A-2 of the display panel 16.

Next, the display device 100 controls corresponding circuits to display second image data B on the second area A-2 of the display panel 16 during a second display time T2 of one frame period.

In this regard, the display device 100 controls corresponding circuits to provide second inverted data B-b obtained by inverting the second image data B to the first area A-1 of the display panel 16 for a portion of the second display time T2.

In one example, the second display time T2 is set to be larger than ½ of one frame period.

In one example, the first display time T1 and the second display time T2 are set to partially overlap each other in one frame period.

The display device 100 controls the touch driving circuit 17 to apply a touch driving signal to the display panel 16 for the portion of the second display time T2. In one example, the display device 100 may apply a touch driving signal to the display panel 16 while the second inverted data B-b is provided to the first area A-1 of the display panel 16.

Figure 5:
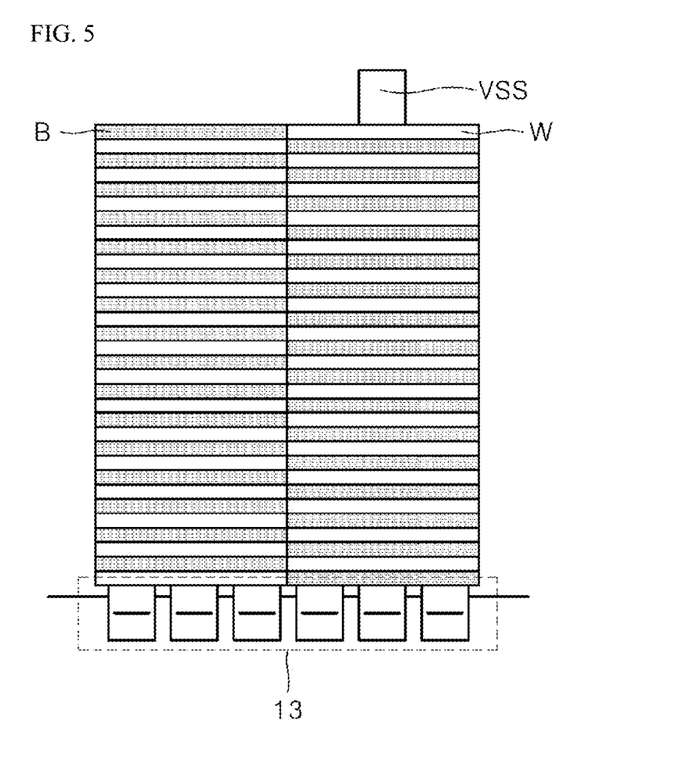
FIG. 5 is a block diagram for testing noise influence based on data transition in a display device according to an embodiment.
Figure 6:
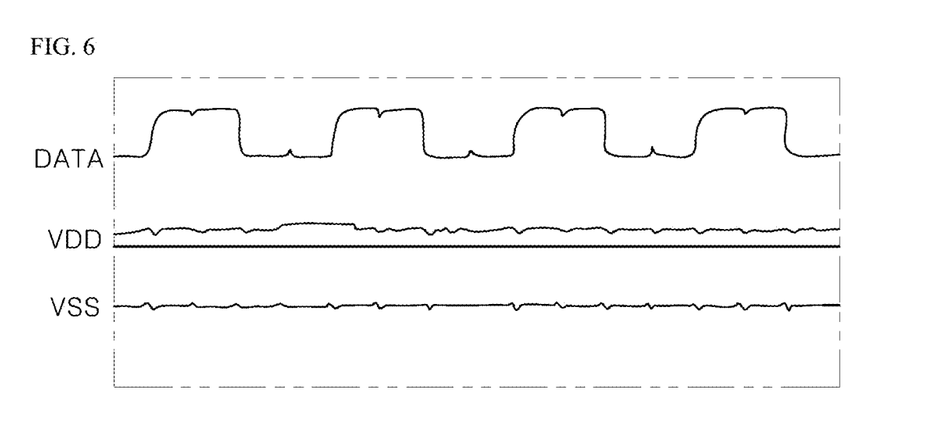
FIG. 6 is a waveform diagram of power voltage based on data transition as measured in the display device shown in FIG. 5.
Figure 7:
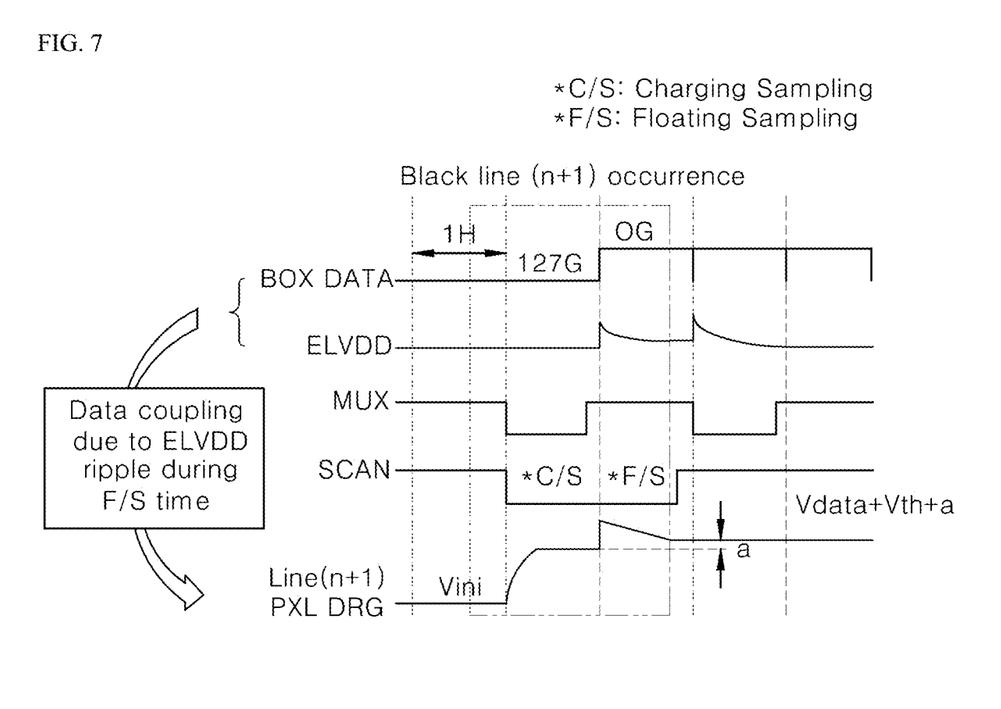
FIG. 7 is a timing diagram showing noise influence based on data transition in a display device according to an embodiment.

FIG. 5 is a block diagram for testing noise influence based on data transition in a display device according to an embodiment. FIG. 6 is a waveform diagram of power voltage based on data transition as measured in the display device shown in FIG. 5. FIG. 7 is a timing diagram showing noise influence based on data transition in a display device according to an embodiment.

As shown in FIG. 5 and FIG. 7, the waveforms of the power voltages VDD and VSS based on the transition from black data to white data or from white data to black data were measured.

In one example, the first area and second area division displays are sequentially driven at 120 Hz in the upper/lower display data isolation structure. In the first area display, the inverted data obtained by inverting the image data applied to the first area is applied to the second area while the second area is not scanned, such that a noise reduction effect due to the ELVDD/ELVSS data coupling offset effect may occur. An effect of increasing a 240 Hz pen touch SNR in the cancelling period may be realized.

In this way, the display device 100 may bring about an effect of increasing a high-speed driving sampling time in driving the first area A-1 and the second area A-2 in the overlapping manner. In one example, in driving the first area A-1 and the second area A-2 in the overlapping manner, an effect of increasing the sampling time from 120 Hz 1Frame 8.4 ms to 120 Hz 1Frame to 11.6 ms may be achieved, and an improvement of 1H Time from 2.2 us to 3.1 us may be achieved.

Further, the display device 100 has the effect of improving horizontal C/T. In one example, when the 120 Hz reference horizontal C/T improvement effect is pre-verified, reference ELVDD ripple is reduced from 98 mV before compensation to 42 mV after compensation based on data transition from 127 G to 0 G, thereby improving visibility.

Figure 8:
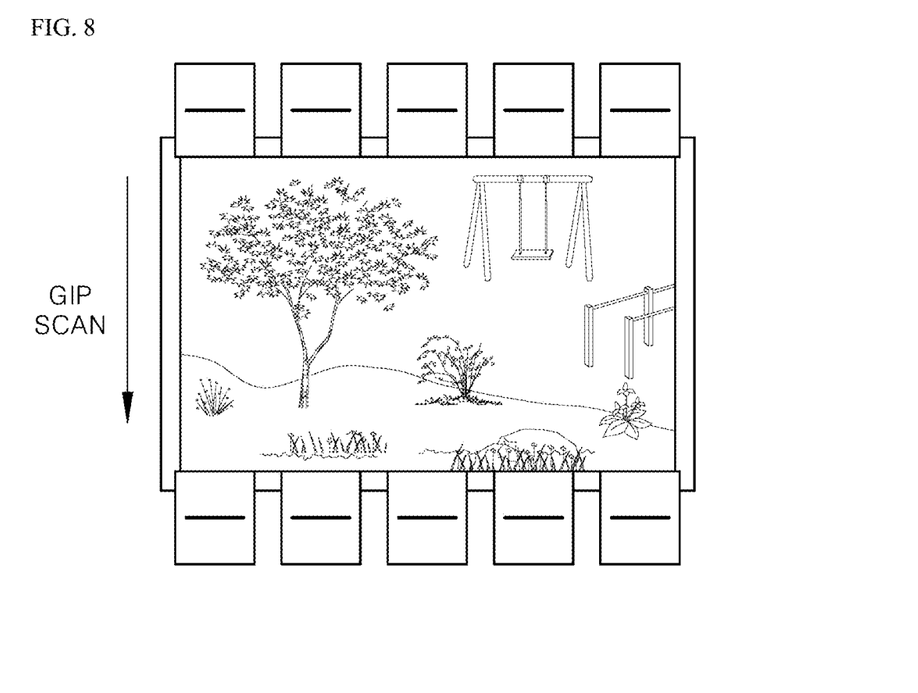
FIG. 8 is a block diagram for illustrating a method for driving a display device according to still another embodiment.
Figure 9:
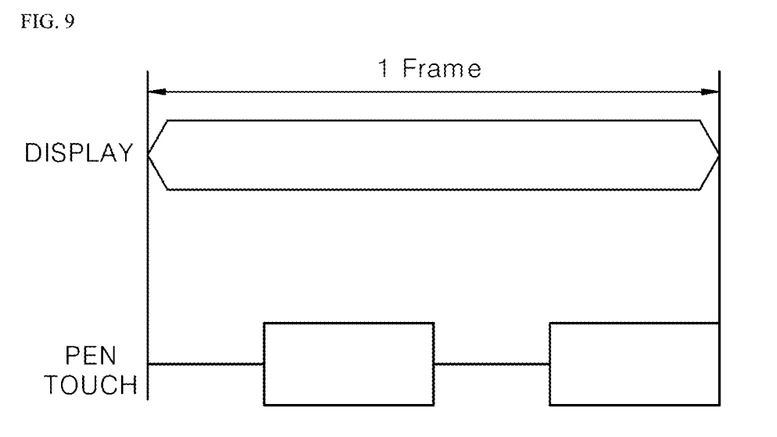
FIG. 9 is a timing diagram for illustrating a method for driving the display device as disclosed in FIG. 8.

FIG. 8 is a block diagram for illustrating a method for driving a display device according to another embodiment. FIG. 9 is a timing diagram to illustrate the method for driving the display device as disclosed in FIG. 8.

As shown in FIG. 8 and FIG. 9, the display device 100 may display image data on the display panel during one frame period, and may provide a touch driving signal to the display panel for at least a portion of one frame period to sense touch data coordinates.

Figure 10:
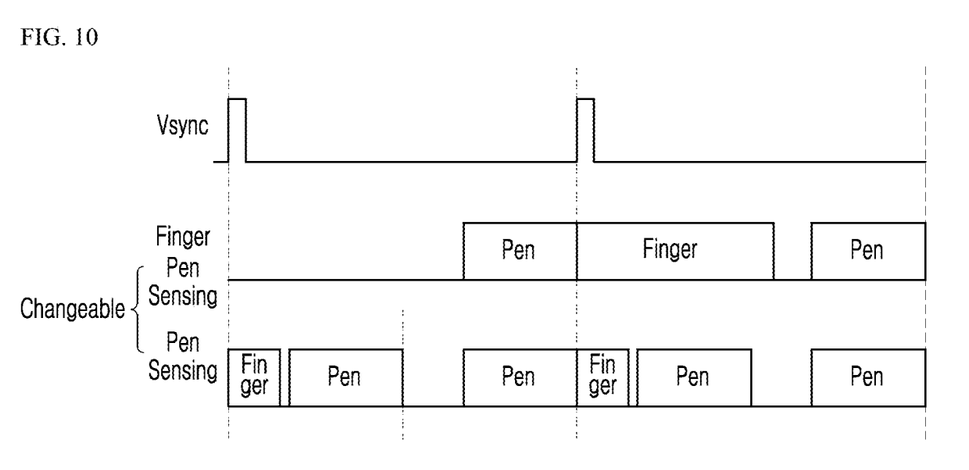
FIG. 10 is a timing diagram showing touch sensing in the display device shown in FIG. 8.
Figure 11:
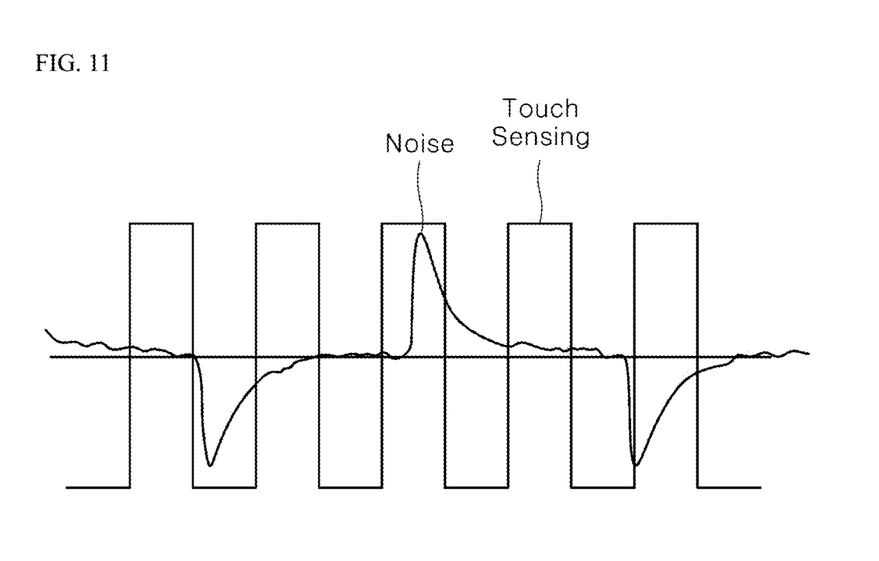
FIG. 11 is a diagram showing display noise due to touch sensing in the display device shown in FIG. 8.

FIG. 10 is a timing diagram showing touch sensing in the display device as shown in FIG. 8. FIG. 11 is a diagram showing display noise due to touch sensing in the display device as shown in FIG. 8.

Referring to FIG. 10 and FIG. 11, when the display device 100 provides a touch driving signal to the display panel for at least a portion of one frame period to sense the touch data coordinates, the touch SNR may decrease because the low power voltage ELVSS coupled to the image data affects the touch sensing.

In one example, the display noise may be coupled to pen touch sensing in the pen touch operation during the display time, such that the touch SNR may be reduced. The touch SNR in the pen touch operation may decrease more significantly than that in a finger touch operation.

Figure 12A:
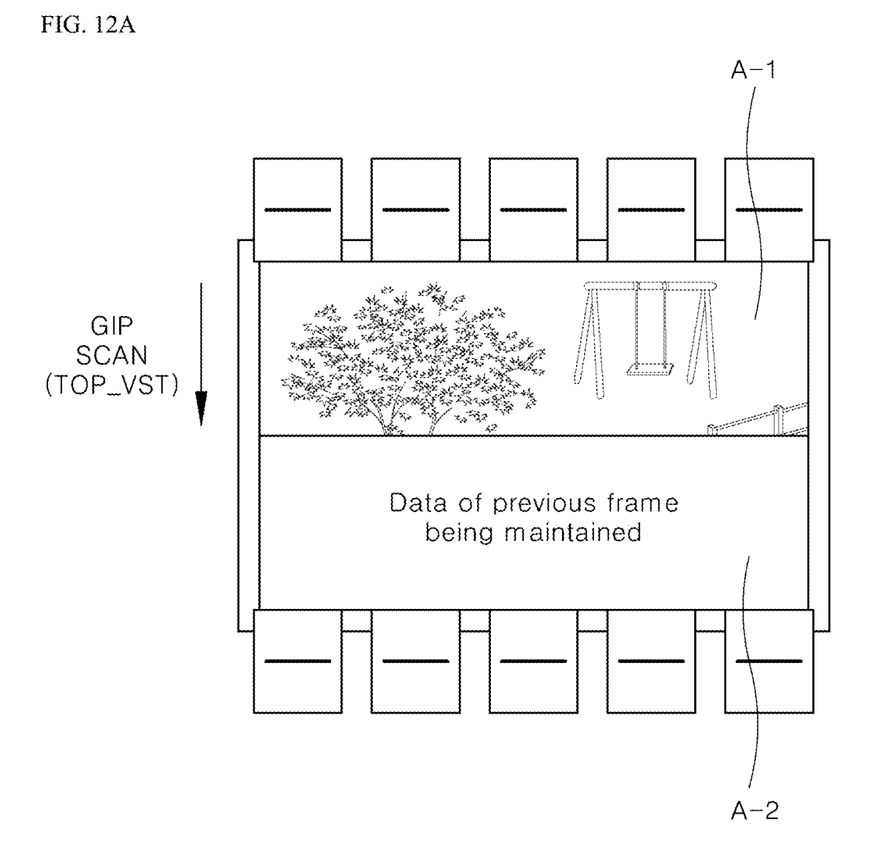
FIG. 12A and FIG. 12B are block diagrams for illustrating a method for driving a display device according to still yet another embodiment.
Figure 12B:
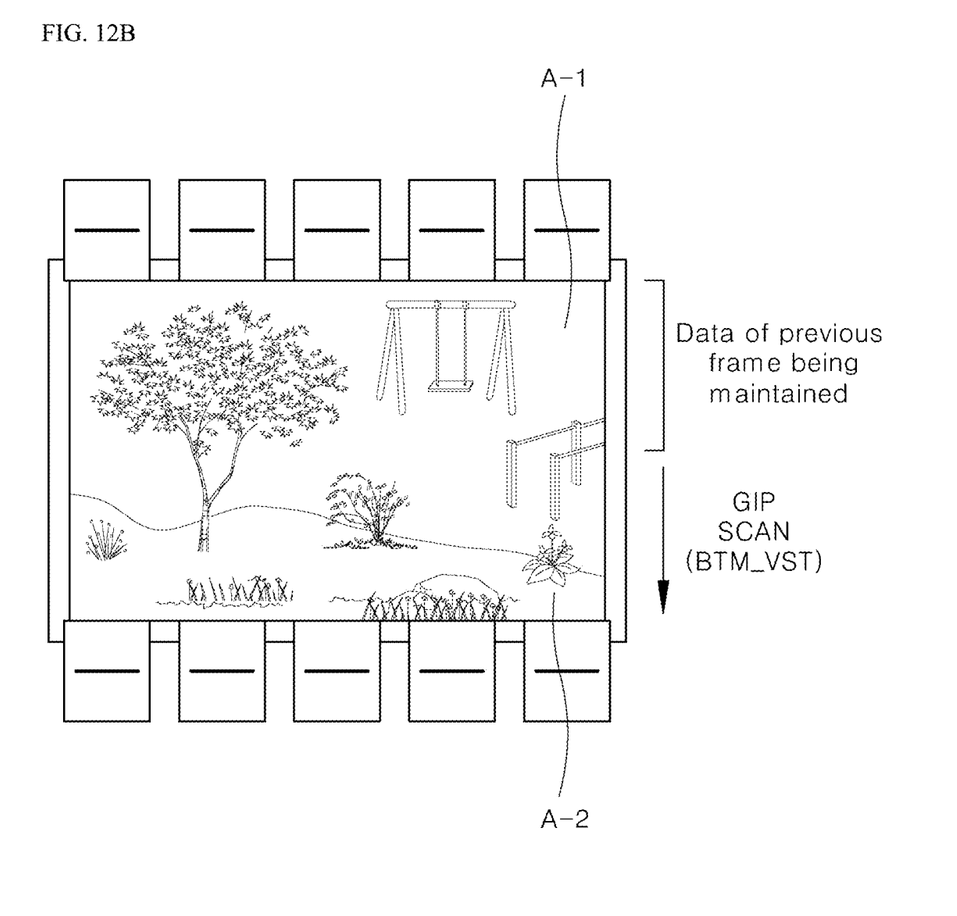
Figure 13:
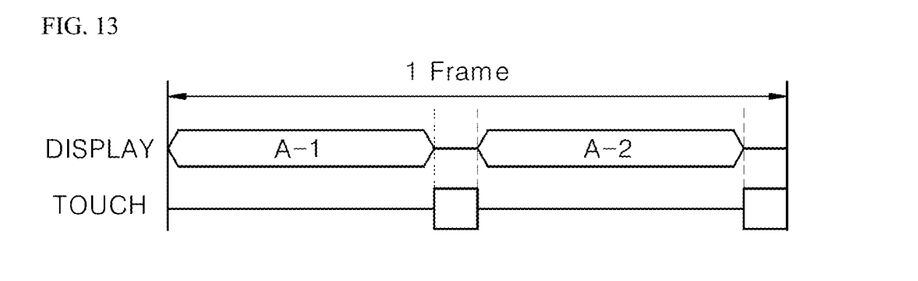
FIG. 13 is a timing diagram for illustrating the method for driving the display device as disclosed in FIG. 12A and FIG. 12B.

FIG. 12A and FIG. 12B are block diagrams for illustrating a method for driving a display device according to still another embodiment. FIG. 13 is a timing diagram for illustrating the method for driving the display device as disclosed in FIG. 12A and FIG. 12B.

Referring to FIG. 12A, FIG. 12B, and FIG. 13, the display device 100 may separate the touch operation from the display operation during a vertical blank period.

In one example, the display device 100 controls corresponding circuits to display image data on the first area A-1 of the display panel during a first display time of one frame period. In this regard, the display device 100 controls corresponding circuits to maintain the image data of a previous frame in the first area A-1 of the display panel.

The display device 100 may apply a touch driving signal to the display panel to sense touch coordinate data during the vertical blank period.

The display device 100 controls corresponding circuits to display the image data on the second area A-2 of the display panel during a second display time of one frame period. In this regard, the display device 100 controls corresponding circuits to maintain the image data of the previous frame in the second area A-2 of the display panel. The deterioration in image quality may occur when the touch operation is separated from the display operation during the vertical blank period.

In order to solve this problem, the display device 100 according to an embodiment includes the display panel 16 divided into the first area A-1 and the second area A-2, the first source driving circuit 13 and the second source driving circuit 14 providing the source signal to the first area A-1 and the second area A-2, respectively, the gate driving circuit 15 providing the scan signal to each of the first area A-1 and the second area A-2, the touch driving circuit 17 applying the touch driving signal to the display panel 16 and sensing the touch signal, and the timing controller 12 that controls the first source driving circuit 13, the second source driving circuit 14, the gate driving circuit 15 and the touch driving circuit 17.

In this regard, the timing controller 12 controls the first source driving circuit 13 and the gate driving circuit 15 to display first image data on the first area A-1 during a first display time T1, wherein the timing controller 12 controls the second source driving circuit 14 and the gate driving circuit 15 to provide a source signal corresponding to first inverted data obtained by inverting the first image data to the second area A-2 during the first display time T1.

The timing controller 12 controls the gate driving circuit 15 to sequentially output the scan signal to gate lines of the first area A-1 during the first display time T1 and not to output the scan signal to gate lines of the second area A-2 during the first display time T1.

The timing controller 12 controls the first source driving circuit 13 and the gate driving circuit 15 to output a source voltage corresponding to the first image data to pixels of the first area A-1 during the first display time T1, wherein the timing controller 12 controls the second source driving circuit 14 and the gate driving circuit 15 to output a source voltage corresponding to the first inverted data to data lines of the second area A-2 during the first display time T1.

The timing controller 12 controls the touch driving circuit 17 to apply the touch driving signal to the display panel 16 during the first display time T1.

The timing controller 12 controls the touch driving circuit 17 to apply the touch driving signal to the display panel 16 during a portion of the first display time T1 during which the first inverted data is provided to the second area A-2.

The first display time T1 is set to ½ of one frame period 1 Frame.

The timing controller 12 controls the first source driving circuit 13, the second source driving circuit 14 and the gate driving circuit 15 to provide second inverted data obtained by inverting second image data to the first area A-1 during a second display time T2, and to display the second image data on the second area A-2 during the second display time T2.

The timing controller 12 controls the gate driving circuit 15 to sequentially output the scan signal to gate lines of the second area A-2 during the second display time T2, and not to output the scan signal to gate lines of the first area A-1 during the second display time T2.

The timing controller 12 controls the first source driving circuit 13 and the gate driving circuit 15 to output a source voltage corresponding to the second inverted data to data lines of the second area A-2 during the second display time T2, wherein the timing controller 12 controls the second source driving circuit 14 and the gate driving circuit 15 to output a source voltage corresponding to the second image data to pixels of the second area A-2 during the second display time T2.

The timing controller 12 controls the touch driving circuit 17 to apply the touch driving signal to the display panel 16 during the second display time T2.

The timing controller 12 controls the touch driving circuit 17 to apply the touch driving signal to the display panel 16 during a portion of the second display time T2 during which the second inverted data is provided to the first area A-1.

The second display time T2 is set to ½ of one frame period 1 Frame.

Each of the first display time T1 and the second display time T2 is set to be larger than ½ of one frame period 1 Frame such that the first display time T1 and the second display time T2 partially overlap each other in the one frame period 1 Frame.

A method for driving a display device includes controlling, by the timing controller 12, the first source driving circuit 13 and the gate driving circuit 15 to display first image data on the first area A-1 during a first display time T1; and controlling, by the timing controller 12, the second source driving circuit 14 and the gate driving circuit 15 to provide a source signal corresponding to first inverted data obtained by inverting the first image data to the second area A-2 during the first display time T1.

The method further includes controlling, by the timing controller 12, the first source driving circuit 13 and the gate driving circuit 15 to provide second inverted data obtained by inverting second image data to the first area A-1 during a second display time T2; and controlling, by the timing controller 12, the second source driving circuit 14 and the gate driving circuit 15 to display the second image data on the second area A-2 during the second display time T2.

The method further includes controlling, by the timing controller 12, the gate driving circuit 15 to sequentially output the scan signal to gate lines of the first area A-1 during the first display time T1 and not to output the scan signal to gate lines of the second area A-2 during the first display time T1; and controlling, by the timing controller 12, the gate driving circuit 15 to sequentially output the scan signal to the gate lines of the second area A-2 during the second display time T2 and not to output the scan signal to the gate lines of the first area A-1 during the second display time T2.

The method further includes controlling, by the timing controller 12, the touch driving circuit 17 to apply the touch driving signal to the display panel 16 during each of the first display time T1 and the second display time T2.

Applying the touch driving signal includes: applying the touch driving signal when a source signal corresponding to the first inverted data is outputted to data lines of the second area A-2; and applying the touch driving signal when a source signal corresponding to the second inverted data is outputted to data lines of the first area A-1.

In the method, each of the first and second display time T2s is set to ½ of one frame period 1 Frame.

In the method, each of the first display time T1 and the second display time T2 is set to be larger than ½ of one frame period 1 Frame such that the first display time T1 and the second display time T2 partially overlap each other in the one frame period 1 Frame.

In the display device 100 according to another embodiment, the timing controller 12 control the first source driving circuit 13 to display the first image data A to the display panel 16 during the first display time T1 of one frame period 1 Frame.

The timing controller 12 control the second source driving circuit 14 and the gate driving circuit 15 to provide a source signal corresponding to the first inverted data A-a obtained by inverting the first image data A to the second area A-2 of the display panel 16 during a portion of the first display time T1. The first display time T1 is set to be larger than ½ of one frame period.

The timing controller 12 controls the touch driving circuit 17 to apply a touch driving signal to the display panel 16 during the portion of the first display time T1. The timing controller 12 applies a touch driving signal to the display panel 16 while the first inverted data A-a is provided to the second area A-2 of the display panel 16.

The timing controller 12 controls corresponding circuits to display the second image data B on the second area A-2 of the display panel 16 during the second display time T2 of one frame period 1 Frame.

The timing controller 12 provides the second inverted data B-b obtained by inverting the second image data B to the first area A-1 of the display panel 16 during a portion of the second display time T2. The second display time T2 is set to be larger than ½ of one frame period.

The timing controller 12 controls the touch driving circuit 17 to apply a touch driving signal to the display panel 16 during the portion of the second display time T2. The timing controller 12 applies a touch driving signal to the display panel 16 while the second inverted data B-b is provided to the first area A-1 of the display panel 16.

The display device and the driving method thereof according to an embodiment may compensate for the noise caused by the image data with the inverted image data, thereby canceling the noise component.

Further, the display device and the driving method thereof according to an embodiment may reduce or avoid the display noise to improve the touch SNR.

Further, the display device and the driving method thereof according to an embodiment may perform the display operation and the touch operation not in a temporal separation manner but in an temporally overlapping manner, thereby solving the touch sensing time shortage problem and the display charging time shortage problem.

Further, the display device and the driving method thereof according to an embodiment may reduce distortion of the touch sensing signal due to the display noise, so that sensitivity of the touch sensing and quality of the display image may be improved.

It will be apparent to those skilled in the art that various modifications and variations can be made in the display device and the method for driving the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:
   a display panel divided into a first area and a second area;
   a first source driving circuit and a second source driving circuit for providing a source signal to the first area and the second area, respectively;
   a gate driving circuit for providing a scan signal to each of the first area and the second area;
   a touch driving circuit for applying a touch driving signal to the display panel and sensing a touch signal; and
   a timing controller for controlling the first source driving circuit, the second source driving circuit, the gate driving circuit, and the touch driving circuit,
   wherein, during a first display time of one frame period, the timing controller is configured to control the first source driving circuit to display first image data on the first area and the gate driving circuit to sequentially output the scan signal to gate lines of the first area,
   wherein, during the first display time of the one frame period, the timing controller is configured to control the second source driving circuit to provide a source signal corresponding to first inverted data obtained by inverting the first image data to the second area and the gate driving circuit not to output the scan signal to gate lines of the second area, and
   wherein, during the first display time of the one frame period, the timing controller is configured to control the touch driving circuit to apply the touch driving signal to the second area provided with the source signal corresponding to the first inverted data.

2. The display device of claim 1, wherein the timing controller controls the first source driving circuit and the gate driving circuit to output a source voltage corresponding to the first image data to pixels of the first area during the first display time,
   wherein the timing controller controls the second source driving circuit and the gate driving circuit to output a source voltage corresponding to the first inverted data to data lines of the second area during the first display time.

3. The display device of claim 1, wherein the timing controller controls the touch driving circuit to apply the touch driving signal to the display panel during the first display time.

4. The display device of claim 1, wherein the timing controller controls the touch driving circuit to apply the touch driving signal to the display panel during a portion of the first display time during which the first inverted data is provided to the second area.

5. The display device of claim 1, wherein the first display time is set to ½ of one frame period.

6. The display device of claim 1, wherein the touch driving signal is applied to the display panel while the first inverted data is provided to the second area.

7. The display device of claim 1, wherein the timing controller controls the first source driving circuit, the second source driving circuit and the gate driving circuit to provide second inverted data obtained by inverting second image data to the first area during a second display time, and to display the second image data on the second area during the second display time.

8. The display device of claim 7, wherein the timing controller controls the touch driving circuit to apply the touch driving signal to the display panel during the second display time.

9. The display device of claim 7, wherein the timing controller controls the touch driving circuit to apply the touch driving signal to the display panel during a portion of the second display time during which the second inverted data is provided to the first area.

10. The display device of claim 7, wherein the second display time is set to ½ of one frame period.

11. The display device of claim 7, wherein each of the first display time and the second display time is set to be larger than ½ of one frame period such that the first display time and the second display time partially overlap each other in the one frame period.

12. The display device of claim 7, wherein the first inverted data and the second inverted data are data corresponding to a gray-scale voltage obtained by inverting a gray-scale voltage corresponding to the first image data and the second image data, based on an intermediate gray-scale voltage in a gray-scale range, respectively.

13. The display device of claim 7, wherein the touch driving signal is applied to the display panel while the second inverted data is provided to the first area.

14. The display device of claim 7, wherein the timing controller controls the gate driving circuit to sequentially output the scan signal to gate lines of the second area during the second display time, and not to output the scan signal to gate lines of the first area during the second display time.

15. The display device of claim 14, wherein the timing controller controls the first source driving circuit and the gate driving circuit to output a source voltage corresponding to the second inverted data to data lines of the second area during the second display time,
   wherein the timing controller controls the second source driving circuit and the gate driving circuit to output a source voltage corresponding to the second image data to pixels of the second area during the second display time.

16. A method for driving a display device, wherein the display device includes:
a display panel divided into a first area and a second area;
a first source driving circuit and a second source driving circuit for providing a source signal to the first area and the second area, respectively;
a gate driving circuit for providing a scan signal to each of the first area and the second area;
a touch driving circuit for applying a touch driving signal to the display panel and sensing a touch signal; and
a timing controller for controlling the first source driving circuit, the second source driving circuit, the gate driving circuit, and the touch driving circuit, and
wherein the method comprises:
controlling, by the timing controller, the first source driving circuit to display first image data on the first area and the gate driving circuit to sequentially output the scan signal to gate lines of the first area during a first display time of one frame period; and
controlling, by the timing controller, the second source driving circuit to provide a source signal corresponding to first inverted data obtained by inverting the first image data to the second area and the gate driving circuit not to output the scan signal to gate lines of the second area during the first display time of the one frame period; and
controlling, by the timing controller, the touch driving circuit to apply the touch driving signal to the second area provided with the source signal corresponding to the first inverted data during the first display time of the one frame period.

17. The method of claim 16, further comprising:
controlling, by the timing controller, the first source driving circuit and the gate driving circuit to provide second inverted data obtained by inverting second image data to the first area during a second display time; and
controlling, by the timing controller, the second source driving circuit and the gate driving circuit to display the second image data on the second area during the second display time.

18. The method of claim 17, further comprising:
controlling, by the timing controller, the gate driving circuit to sequentially output the scan signal to the gate lines of the second area during the second display time and not to output the scan signal to the gate lines of the first area during the second display time.

19. The method of claim 17, wherein each of the first and second display times is set to ½ of one frame period.

20. The method of claim 17, wherein each of the first display time and the second display time is set to be larger than ½ of one frame period such that the first display time and the second display time partially overlap each other in the one frame period.

21. The method of claim 17 wherein the first inverted data and the second inverted data are data corresponding to a gray-scale voltage obtained by inverting a gray-scale voltage corresponding to the first image data and the second image data, based on an intermediate gray-scale voltage in a gray-scale range, respectively.

22. The method of claim 17, further comprising controlling, by the timing controller, the touch driving circuit to apply the touch driving signal to the display panel during each of the first display time and the second display time.

23. The method of claim 22, wherein applying the touch driving signal includes:
applying the touch driving signal while a source signal corresponding to the first inverted data is outputted to data lines of the second area; and
applying the touch driving signal while a source signal corresponding to the second inverted data is outputted to data lines of the first area.

24. A display device, comprising:
a display panel divided into a first area and a second area;
a first source driving circuit and a second source driving circuit for providing a source signal to the first area and the second area, respectively;
a gate driving circuit for providing a scan signal to each of the first area and the second area; and
a touch driving circuit for applying a touch driving signal to the display panel and sensing a touch signal;
a timing controller for controlling the first source driving circuit, the second source driving circuit and the gate driving circuit,
wherein the timing controller is configured to control the first source driving circuit to display first image data on the first area and the gate driving circuit to sequentially output the scan signal to gate lines of the first area during a first display time of one frame period,
wherein the timing controller is configured to control the second source driving circuit to provide a source signal corresponding to first inverted data obtained by inverting the first image data to the second area and the gate driving circuit not to output the scan signal to gate lines of the second area during the first display time of the one frame period,
wherein the timing controller is configured to control the touch driving circuit to apply a touch driving signal to the second area provided with the source signal corresponding to the first inverted data during the first display time of the one frame period,
wherein the timing controller is configured to controls the first source driving circuit, the second source driving circuit and the gate driving circuit to provide second inverted data obtained by inverting second image data to the first area during a second display time of the one frame period, and to display the second image data on the second area during the second display time of the one frame period, and
wherein the timing controller is configured to control the touch driving circuit to apply the touch driving signal to the first area provided with the second inverted data during the second display time of the one frame period.

* * * * *